United States Patent
Cai et al.

(10) Patent No.: US 11,788,831 B2
(45) Date of Patent: Oct. 17, 2023

(54) SIX-DEGREE-OF-FREEDOM MEASUREMENT METHOD BY MACHINE VISION BASED ON PHYSICAL DECOUPLING

(71) Applicants: National Institute of Metrology, China, Beijing (CN); Guizhou University, Guizhou (CN)

(72) Inventors: Chenguang Cai, Beijing (CN); Ying Zhang, Beijing (CN); Zhihua Liu, Beijing (CN); Ming Yang, Guizhou (CN); Wen Ye, Beijing (CN); Yan Xia, Beijing (CN)

(73) Assignees: National Institute of Metrology, China, Beijing (CN); Guizhou University, Guiyang (CN)

( * ) Notice: Subject to any disclaimer, the term of this patent is extended or adjusted under 35 U.S.C. 154(b) by 156 days.

(21) Appl. No.: 17/508,260

(22) Filed: Oct. 22, 2021

(65) Prior Publication Data

US 2022/0042786 A1 Feb. 10, 2022

(30) Foreign Application Priority Data

Oct. 22, 2020 (CN) .......................... 202011139959.5

(51) Int. Cl.
*G01B 11/00* (2006.01)
*G06T 7/13* (2017.01)
(Continued)

(52) U.S. Cl.
CPC .............. *G01B 11/002* (2013.01); *G06T 7/13* (2017.01); *G06T 7/20* (2013.01); *G06T 7/60* (2013.01); *G06T 7/70* (2017.01)

(58) Field of Classification Search
CPC .......... G01B 11/002; G06T 7/13; G06T 7/20; G06T 7/60; G06T 7/70; G06T 2207/10016; G06T 7/73
See application file for complete search history.

(56) References Cited

FOREIGN PATENT DOCUMENTS

| CN | 104197960 | * | 12/2014 |
| CN | 105809689 A | | 7/2016 |

(Continued)

OTHER PUBLICATIONS

Kim et al., "Visual Measurement of a 3-D Plane Pose by a Cylindrical Structured Light", proceedings of the 1993 IEEWRSJ Inumauonal Conference on (Year: 1993).*

(Continued)

*Primary Examiner* — Qian Yang (57) ABSTRACT

A six-degree-of-freedom measurement method by machine vision based on physical decoupling. A point projector capable of emitting three laser beams perpendicular to each other is placed on a measured object. A rear-projection screen is configured to allow the three laser beams to be projected thereon as three laser points. The collection of motion images is performed by a camera. Plane coordinates of the three laser points are obtained by processing a sequence image. A mathematical decoupling model is built according to a nature of sphere and a spatial position relationship of three laser beams. The plane coordinates of the three laser points are input into the mathematical decoupling model to obtain six-degree-of-freedom information of the measured object.

4 Claims, 5 Drawing Sheets

(51) Int. Cl.
*G06T 7/70* (2017.01)
*G06T 7/20* (2017.01)
*G06T 7/60* (2017.01)

(56) References Cited

FOREIGN PATENT DOCUMENTS

| CN | 107246866 | * 10/2017 |
| CN | 110500990 A | 11/2019 |
| EP | 3 034 995 | * 12/2014 |

OTHER PUBLICATIONS

Zhao et al., "Six Degrees of Freedom Displacement Measurement System for Wafer Stage Composed of Hall Sensors", Sensors 2018, 18, 2030; doi:10.3390/s18072030 (Year: 2018).*
Machine translation for CN 104197960 (Year: 2014).*
Machine translation for CN 107246866 (Year: 2017).*
Machine translation for EP 3 034 995 (Year: 2014).*

* cited by examiner

SIX-DEGREE-OF-FREEDOM MEASUREMENT METHOD BY MACHINE VISION BASED ON PHYSICAL DECOUPLING

CROSS-REFERENCE TO RELATED APPLICATIONS

This application claims the benefit of priority from Chinese Patent Application No. 202011139959.5, filed on Oct. 22, 2020. The content of the aforementioned applications, including any intervening amendments thereto, is incorporated herein by reference in its entirety.

TECHNICAL FIELD

This application relates to machine vision measurement, and more particularity to a non-contacting and real-time six-degree-of-freedom measurement method by machine vision based on physical decoupling.

BACKGROUND

Six degrees of freedom refer to spatial position and posture information of a rigid body. The high-precision six-degree-of-freedom measurement is required in many fields, including robot calibration, precision equipment assembly, precision docking and navigation. For different task requirements and application environments, multi-degree-of-freedom measurement methods such as measurements based on laser trackers, cameras, sensors, and coordinate measuring machine have been proposed. The machine vision-based measurement has the following advantages: 1) non-contact measurement; without affecting the motion of the measured object; 2) simultaneous measurement of six-degree-of-freedom; and 3) high measurement precision, low measurement cost, and flexible and efficient operation. The improvement of vision sensor manufacturing technology and the maturation of vision measurement theory have significantly enhanced the measurement accuracy of the machine vision measurement, so that it has attracted wide attention in the measurement of multi-degree-of-freedom.

In the traditional machine vision-based measurement, the six-degree-of-freedom decoupling is usually performed using a nonlinear mathematical model. However, due to low computing accuracy and large calculation amount of the nonlinear mathematical model, the traditional machine vision measurement cannot arrive at the high-precision and real-time six-degree-of-freedom measurement. An effective way to improve the computing accuracy and reduce the amount of calculation of the nonlinear mathematical model is to design and utilize redundant information to eliminate nonlinear coupling terms in relationship, so as to linearize the nonlinear equations.

Accordingly, the present disclosure provides a six-degree-of-freedom measurement method by machine vision based on physical decoupling, in which a point projector and a rear-projection screen are employed to equivalently map a spatial six-degree-of-freedom motion to a plane motion of three laser points, and plane coordinates of the three laser points are obtained by machine vision; and finally, the six-degree-of-freedom information of Stewart platform is obtained by combining a physical decoupling model and a coordinate system transformation. This method realizes the dimensionality reduction of a motion space of the measured object by physical decoupling, so that the six-degree-of-freedom decoupling model is simplified, reducing the amount of calculation and improving the computing accuracy.

SUMMARY

An object of the present disclosure is to provide a six-degree-of-freedom measurement method, which enables the simultaneous measurement of six-degree-of-freedom of an object, and has a small amount of calculation and high measurement accuracy.

Technical solutions of the disclosure are described as follows.

The disclosure provides a six-degree-of-freedom measurement method by machine vision based on physical decoupling, comprising:

placing a point projector on a measured object to enable the point projector to move with the measured object; placing a rear-projection screen in front of the measured object to enable a laser beam emitted by the point projector to be always projected on the rear-projection screen; placing a camera in front of the rear-projection screen, such that a shooting coverage of the camera covers the rear-projection screen; and performing, by the camera, an image collection for the rear-projection screen to obtain an image sequence;

performing an image processing on the image sequence; utilizing an edge detection and a least squares method to obtain plane coordinates of center points of three ellipses as coordinates of three elliptic laser points; inputting the above plane coordinates into a camera imaging model to obtain coordinates of the three elliptic laser points as $F_1({}^s x_{F1}, {}^s y_{F1}, {}^s z_{F1})$, $F_2({}^s x_{F2}, {}^s y_{F2}, {}^s z_{F2})$, $F_3({}^s x_{F3}, {}^s y_{F3}, {}^s z_{F3})$, building a mathematical decoupling model according to a nature of sphere and a spatial position relationship of three laser beams:

$$\begin{cases} (x - {}^s x_1)^2 + (y - {}^s y_1)^2 + (z - {}^s z_1)^2 = \dfrac{\|F_1 F_2\|^2}{4} \\ (x - {}^s x_2)^2 + (y - {}^s y_2)^2 + (z - {}^s z_2)^2 = \dfrac{\|F_2 F_3\|^2}{4} \\ (x - {}^s x_3)^2 + (y - {}^s y_3)^2 + (z - {}^s z_3)^2 = \dfrac{\|F_1 F_3\|^2}{4} \end{cases}$$

wherein $({}^s x_1, {}^s y_1, {}^s z_1)$, $({}^s x_2, {}^s y_2, {}^s z_2)$ and $({}^s x_3, {}^s y_3, {}^s z_3)$ are spatial coordinates of $O_1$, $O_2$ and $O_3$, respectively; and $({}^s x_1, {}^s y_1, {}^s z_1)$, $({}^s x_2, {}^s y_2, {}^s z_2)$ and $({}^s x_3, {}^s x_3, {}^s x_3)$ are obtained according to values of $F_1$, $F_2$ and $F_3$;

inputting $({}^s x_1, {}^s y_1, {}^s z_1)$, $({}^s x_2, {}^s y_2, {}^s z_2)$ and $({}^s x_3, {}^s y_3, {}^s z_3)$ into the mathematical decoupling model to obtain a six-degree-of-freedom information of the measured object in combination with a pose transformation matrix; and the pose transformation matrix is:

$$ {}^L F = \begin{bmatrix} {}^L R_S & {}^L T_S \\ 0 & 1 \end{bmatrix} {}^S F $$

The beneficial effects of the six-degree-of-freedom measurement method with machine vision based on physical decoupling herein are described as follows.

(1) The disclosure simplifies the mathematical decoupling model, reduces the amount of calculation, and improves a real-time performance by transforming a spatial motion measurement into a plane motion measurement. Moreover, a non-contacting measurement improves a reliability of the measurement method and has a wide range of applications.

(2) The disclosure can simultaneously obtain six-degree-of-freedom information.

(3) The disclosure involves fewer instruments, and thus has a low measurement cost.

DETAILED DESCRIPTION OF EMBODIMENTS

An object of this application is to provide a six-degree-of-freedom measurement method by machine vision based on physical decoupling to overcome high measurement cost and complexity of mathematical model of prior measurement methods. The six-degree-of-freedom measurement method herein is a non-contacting measurement, simplifies the mathematical decoupling model and measures six-degree-of-freedom in real-time by transforming a spatial motion information measurement into a plane motion information measurement. The present disclosure will be described below in detail with reference to the embodiments and appended drawings.

An embodiment of the disclosure provides a six-degree-of-freedom measurement method by machine vision based on physical decoupling, which is specifically described as follows.

(S1) A point projector is placed on a measured object to enable the point projector to move with the measured object. A rear-projection screen is placed in front of the measured object to enable a laser beam emitted by the point projector to be always projected on the rear-projection screen. A camera is placed in front of the rear-projection screen, such that a shooting coverage of the camera covers the rear-projection screen; and an image collection for the rear-projection screen is performed by the camera.

(S2) An image processing is performed on an image sequence. An ellipse center positioning method is utilized to obtain plane coordinates of three laser points.

(S3) A mathematical decoupling model is built according to a nature of sphere and a spatial position relationship of three laser beams.

(S4) The plane coordinates of the three laser points are input into the mathematical decoupling model to obtain a six-degree-of-freedom information of the measured object in combination with a pose transformation matrix.

In an embodiment, the step (S2) is specifically performed as follows.

A rear-projection screen coordinate system $\{S\}$ is built, where a plane formed by $^sx$-$^sy$ coincides with the rear-projection screen, and a direction of $^sz$ is determined by right-hand rule.

When the three laser beams are not perpendicular to the rear-projection screen, the three laser points projected on the rear-projection screen are elliptic, so that the ellipse center positioning method is used to obtain plane coordinates of center points of the three elliptic laser points on the rear-projection screen.

An edge detection is performed according to a pixel value of an image so as to obtain coordinates of edge points of the three elliptic laser points. Coordinates of center points of the three elliptic laser points are obtained through a least squares fitting method, which are $F_1(x_1, y_1)$, $F_2(x_2, y_2)$ and $F_3(x_3, y_3)$, respectively. The least squares fitting formula is expressed as follows:

$$f(A, B, C, D, E, F) = Ax^2 + Bxy + Cy^2 + Dx + Ey + F \quad (1)$$

$$\frac{\partial f}{\partial A} = \frac{\partial f}{\partial B} = \frac{\partial f}{\partial C} = \frac{\partial f}{\partial D} = \frac{\partial f}{\partial E} = \frac{\partial f}{\partial F} = 0 \quad (2)$$

where the formula (1) is an ellipse formula, and it needs to satisfy the formula (2) for minimizing a value of the function $f$. A linear equation set is obtained according to the formula (2). An ellipse coefficient is obtained by solving the linear equation set to obtain a coordinate of a center point of an ellipse.

Coordinates of $F_1$, $F_2$ and $F_3$ in the rear-rear-projection screen coordinate system are obtained through a camera imaging model shown as formula (3):

$$z_c \begin{bmatrix} u \\ v \\ 1 \end{bmatrix} = M_{in} M_{out} \begin{bmatrix} x \\ y \\ z \\ 1 \end{bmatrix} \quad (3)$$

where $z_c$ is a coordinate of a spatial point $A(x,y,z)$ along an optical axis in a camera coordinate system. $(u, v)$ is a coordinate of a projection point $A'$ of the spatial point $A$ in a pixel coordinate system. $M_{in}$ is an intrinsic parameter matrix of the camera obtained by calibrating the camera. $M_{out}$ is an external parameter matrix of the camera obtained by a relative position relationship between the camera coordinate system and the rear-rear-projection screen coordinate system.

Coordinates of $F_1$, $F_2$ and $F_3$ in the rear-projection screen coordinate system are obtained through the formula (1) as $(^sx_{F1}, ^sy_{F1}, ^sz_{F1})$, $(^sx_{F2}, ^sy_{F2}, ^sz_{F2})$ and $(^sx_{F3}, ^sy_{F3}, ^sz_{F3})$, respectively.

In an embodiment, the step (S3) is specifically performed as follows.

Formula (4) is obtained when a point $P(x,y,z)$ is on a sphere $O$:

$$(x-x_0)^2 + (y-y_0)^2 + (z-z_0)^2 = r_0^2 \quad (4)$$

where $(x_0, y_0, z_0)$ is a coordinate of a center point of the sphere O, and $r_0$ is a radius of the sphere O.

According to the formula (4), when there are three non-coincident points on a surface of the sphere O, and a connecting line between two of the three points passes through the center point of the sphere O, a triangle formed by the three points is a right triangle.

Three spheres $O_1$, $O_2$ and $O_3$ are obtained according to a spatial position relationship that the three laser beams are perpendicular to each other, where the spheres $O_1$, $O_2$ and $O_3$ have a diameter of $\|F_1F_2\|$, $\|F_2F_3\|$ and $\|F_1F_3\|$, respectively; $O_1$, $O_2$ and $O_3$ are center points of the spheres $O_1$, $O_2$ and $O_3$, respectively; and $O_1$, $O_2$ and $O_3$ are midpoints of line segments $F_1F_2$, $F_2F_3$ and $F_1F_3$, respectively. The three spheres are expressed as follows:

$$\begin{cases} (x - {}^sx_1)^2 + (y - {}^sy_1)^2 + (z - {}^sz_1)^2 = \dfrac{\|F_1F_2\|^2}{4} \\ (x - {}^sx_2)^2 + (y - {}^sy_2)^2 + (z - {}^sz_2)^2 = \dfrac{\|F_2F_3\|^2}{4} \\ (x - {}^sx_3)^2 + (y - {}^sy_3)^2 + (z - {}^sz_3)^2 = \dfrac{\|F_1F_3\|^2}{4} \end{cases} \quad (5)$$

where $({}^sx_1, {}^sy_1, {}^sz_1)$, $({}^sx_2, {}^sy_2, {}^sz_2)$ and $({}^sx_3, {}^sy_3, {}^sz_3)$ are spatial coordinates of $O_1$, $O_2$ and $O_3$ respectively, $({}^sx_1, {}^sy_1, {}^sz_1)$, $({}^sx_2, {}^sy_2, {}^sz_2)$ and $({}^sx_3, {}^sy_3, {}^sz_3)$ are obtained according to values of $F_1$, $F_2$ and $F_3$.

The spheres $O_1$, $O_2$ and $O_3$ intersect at two points. One of the two points is an intersection point $L({}^sx_1, {}^sy_1, {}^sz_1)$ of the three laser beams solved according to the formula (5). A spatial motion of the point projector by is expressed by a change of a spatial coordinate $L({}^sx_1, {}^sy_1, {}^sz_1)$ of the point projector. Since depth information of $F_1$, $F_2$ and $F_3$ keeps unchanged, a plane spatial motion of the three laser points is represented by changes of plane coordinates of $F_1$, $F_2$ and $F_3$.

The mathematical decoupling model of the measured object from spatial motion measurement to plane motion measurement is built by the formula (5).

In an embodiment, the step (S4) is specifically performed as follows.

A point projector coordinate system {P} is built, where an origin point of the point projector coordinate system is an intersection point L of the three laser beams, ${}^Lx$, ${}^Ly$ and ${}^Lz$ coincide with directions of the three laser beams, respectively.

Coordinates of the origin point of the point projector coordinate system {P} and unit vectors of ${}^Lx$, ${}^Ly$ and ${}^Lz$ in the rear-projection screen coordinate system {S} are obtained based on spatial coordinates of L, $F_1$, $F_2$ and $F_3$, expressed as the following homogeneous matrix:

$${}^sF = \begin{bmatrix} {}^sx_L & {}^sx_1 & {}^sy_1 & {}^sz_1 \\ {}^sy_L & {}^sx_2 & {}^sy_2 & {}^sz_2 \\ {}^sz_L & {}^sx_3 & {}^sy_3 & {}^sz_3 \\ 1 & 1 & 1 & 1 \end{bmatrix} \quad (6)$$

A rotation matrix ${}^LR_S$ and a translation matrix ${}^LT_S$ of the point projector coordinate system {P} and the rear-projection screen coordinate system {S} are obtained by combining a coordinate system transformation formula shown in formula (7) with ${}^sF$:

$${}^LF = \begin{bmatrix} 0 & 1 & 0 & 0 \\ 0 & 0 & 1 & 0 \\ 0 & 0 & 0 & 1 \\ 1 & 1 & 1 & 1 \end{bmatrix} = \begin{bmatrix} {}^LR_S & {}^LT_S \\ 0 & 1 \end{bmatrix} {}^sF \quad (7)$$

Six-degree-of-freedom information $(x,y,x,\alpha,\beta,\gamma)$ of the point projector are obtained according to ${}^LR_S$ and ${}^LT_S$; and according to the step (S1). The six-degree-of-freedom information of the point projector is consistent with six-degree-of-freedom information of the measured object, thus the six-degree-of-freedom information of the measured object is obtained.

Figure 1:
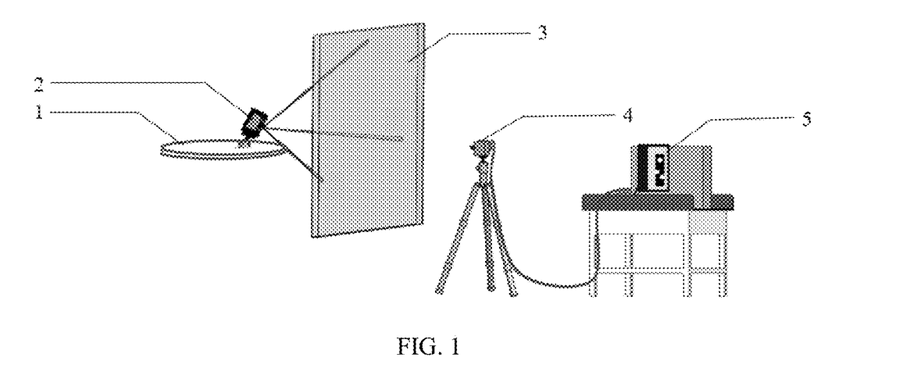
FIG. 1 schematically depicts an apparatus according to an embodiment of the present disclosure.

Referring to FIG. 1, an apparatus herein includes: a measured object 1, a point projector 2, a rear-projection screen 3, a camera 4 and a processor 5. The measured object 1 performs a series of six-degree-of-freedom motion. The point projector 2 capable of emitting three laser beams perpendicular to each other is placed on a measured object. The projector screen 3 is configured to allow the three laser beams to be projected thereon as three laser points. The camera 4 is configured to perform collection of plane motion images on sequence of the three laser points. The processor 5 is configured to perform image processing and compute the mathematical model.

Figure 2:
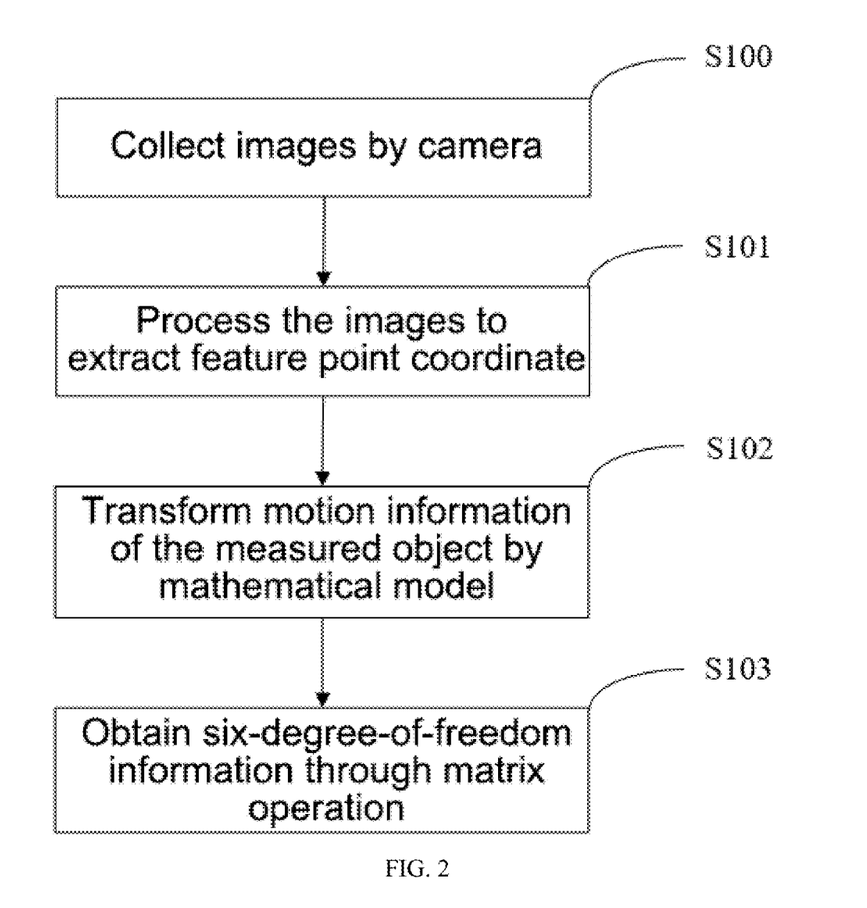
FIG. 2 is a flow chart of a six-degree-of-freedom measurement method by machine vision based on physical decoupling according to an embodiment of the present disclosure.

Referring to FIG. 2, the six-degree-of-freedom measurement method is specifically performed as follows.

(S100) The point projector moves with the measured object, such that the three laser points on the rear-projection screen move correspondingly. A sequence of plane motion images of the three laser points are collected by the camera.

(S101) The sequence of the images are read and processed to obtain spatial coordinates of the three laser points.

(S102) The spatial coordinates of the three laser points are input to the mathematical decoupling model to obtain a spatial coordinate of the intersection point L of the three lasers, such that the plane motion information is transformed to the spatial motion information.

(S103) The spatial coordinate of the intersection point L and the spatial coordinates of the three laser points are input to a coordinate transformation matrix to obtain the six-degree-of-freedom information.

Figure 3:
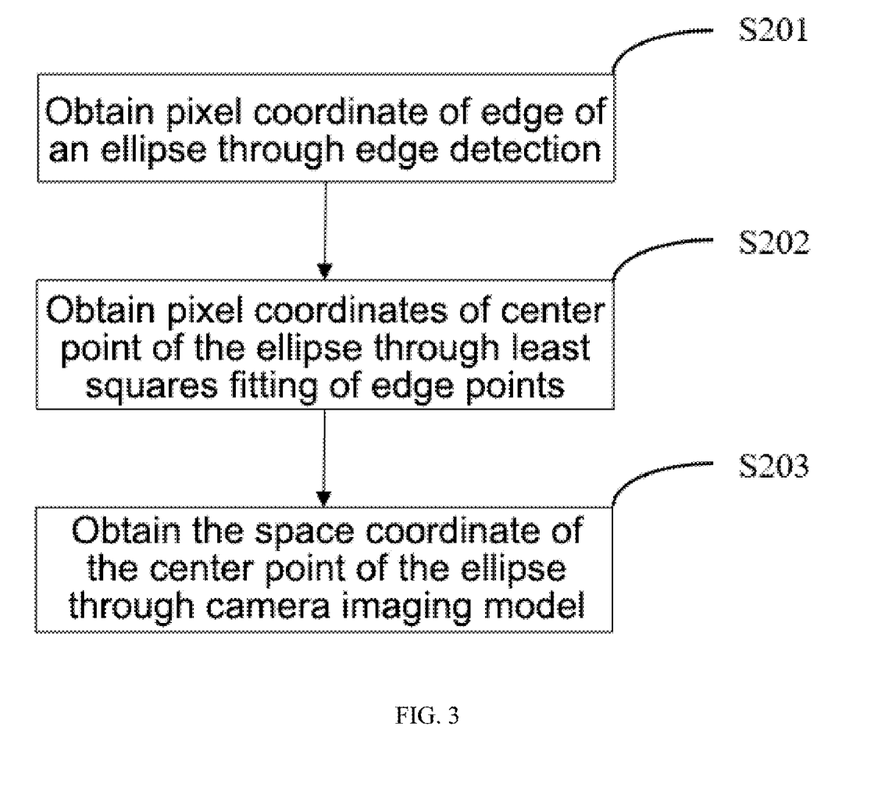
FIG. 3 is a flow chart of image processing.

Referring to FIG. 3, the image processing is performed as follows.

(S201) The edge detection is performed on the image sequence to obtain pixel coordinates of edge points of a target area.

(S202) The pixel coordinates of edge points of the target area are fitted by the least squares fitting method to obtain an ellipse formula. The ellipse formula is computed to obtain a pixel coordinate of center point of the ellipse.

(S203) A spatial coordinate of the center point of the ellipse is obtained by utilizing the camera imaging model.

Figure 4:
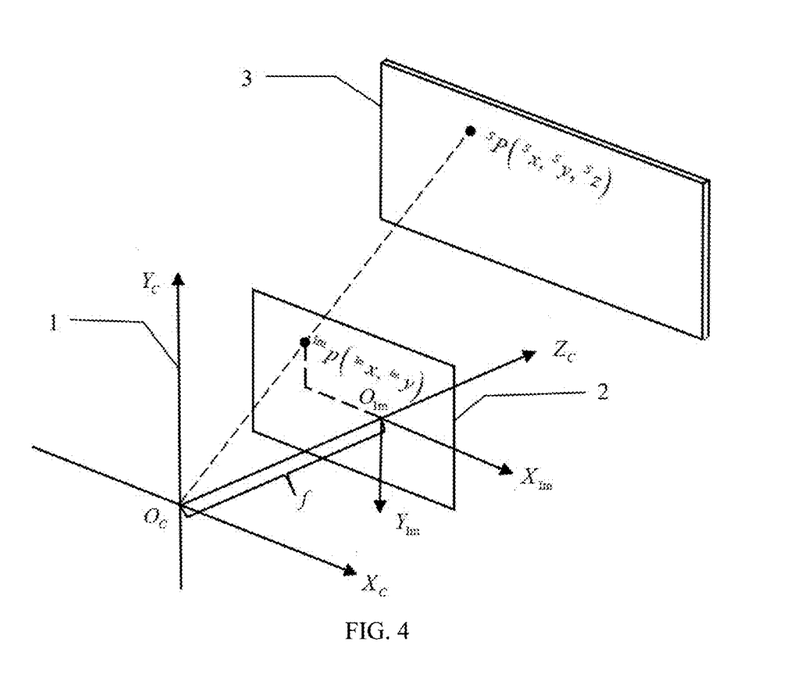
FIG. 4 schematically depicts a principle of a camera imaging.

Referring to FIG. 4, the camera imaging model is obtained:

$$z_c \begin{bmatrix} u \\ v \\ 1 \end{bmatrix} = M_{in} M_{out} \begin{bmatrix} x \\ y \\ z \\ 1 \end{bmatrix} \quad (3)$$

where $z_c$ is a coordinate of a spatial point A(x,y,z) along an optical axis in a camera coordinate system. (u,v) is a coordinate of projection point A' of the spatial point A in a pixel coordinate system. $M_{in}$ is an intrinsic parameter matrix of the camera obtained by the camera calibration. $M_{out}$ is an external parameter matrix of the camera obtained by a relative position relationship between the camera coordinate system and the rear-projection screen coordinate system.

Figure 5:
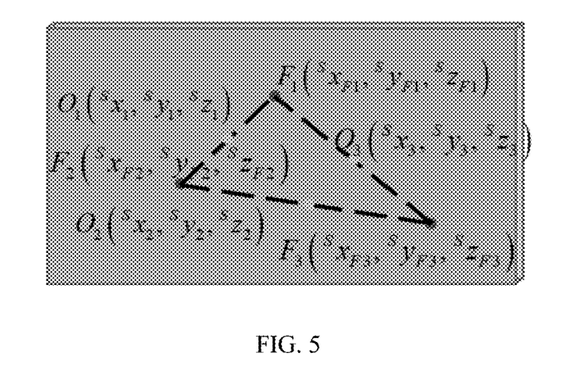
FIG. 5 illustrates a position relationship of three laser points and three spherical centers on a rear-projection screen.
Figure 6A:
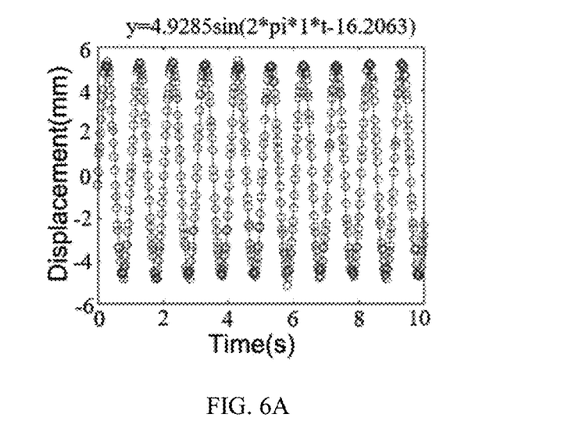
FIGS. 6A-C illustrate results of measuring three degrees of freedom of displacement of a measured object (frequency is 1 Hz), where 6A: displacement along x-axis; 6B: displacement along y-axis; and 6C: displacement along z-axis.
Figure 6B:
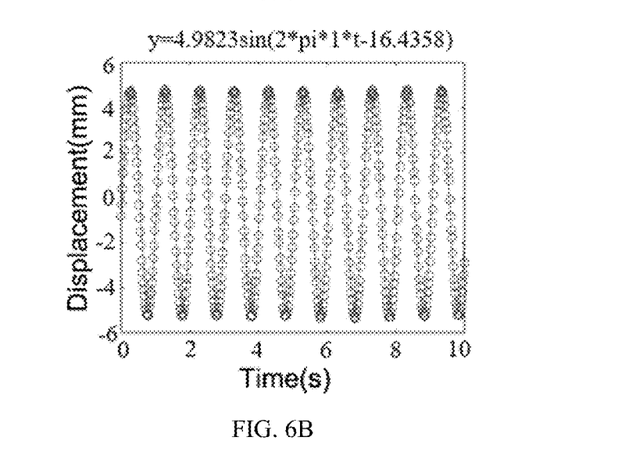
Figure 6C:
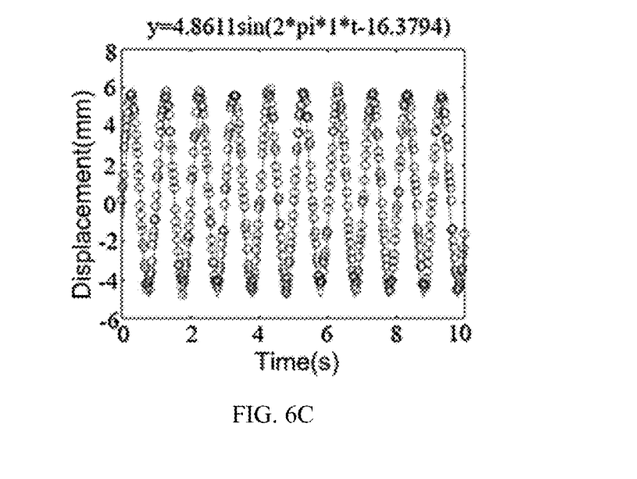
Figure 7A:
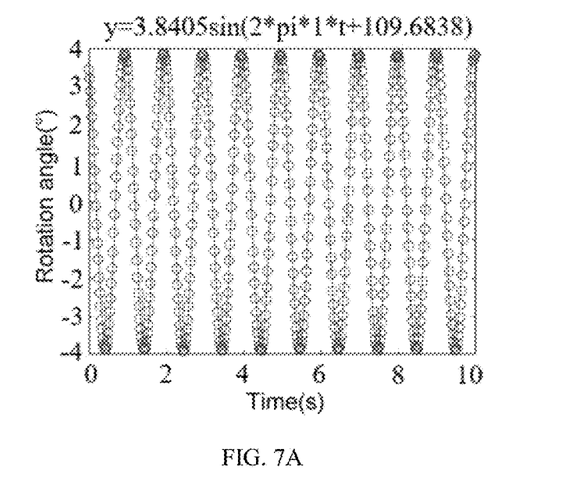
FIGS. 7A-C illustrate results of measuring three degrees of freedom of rotation of the measured object (frequency is 1 Hz), where 6A: rotation around x-axis; 6B: rotation around y-axis; and 6C: rotation around z-axis.
Figure 7B:
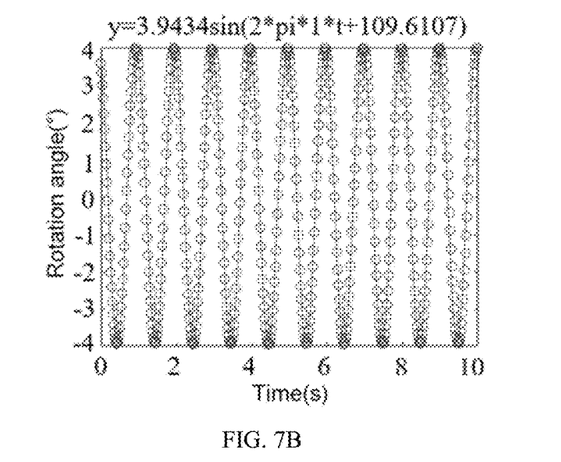
Figure 7C:
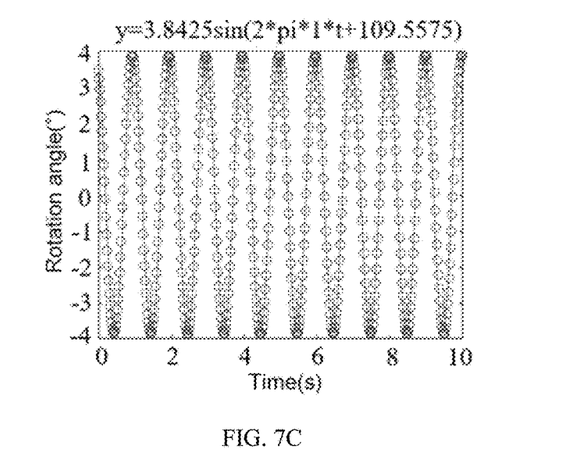

Referring to FIG. 5, the six-degree-of-freedom information of the measured object is obtained by the spatial coordinate of the intersection point of the three laser points and the three laser beams. The steps are specifically performed as follows.

(S301) Spatial coordinates $({}^sx_1, {}^sy_1, {}^sz_1)$, $({}^sx_2, {}^sy_2, {}^sz_2)$ and $({}^sx_3, {}^sy_3, {}^sz_3)$ of sphere center points $O_1$, $O_2$ and $O_3$ respectively, are obtained according to the spatial coordinates of the three laser points.

(S302) Values of $O_1$, $O_2$, $O_3$, $F_1$, $F_2$ and $F_3$ are input to the formula (5) to obtain a spatial coordinate of the intersection point (x, y, z).

(S303) Coordinates of $F_1$, $F_2$, $F_3$ and the intersection point are input to the formula (7) to obtain the six-degree-of-freedom information of the measured object.

Referring to FIGS. 6A-C and 7A-C, an actual motion of the measured object is as follows: displacement is y=5 sin(2ρt) and rotation is y=4 sin(2ρt). The six-degree-of-freedom measurement method herein achieves a six-degree-of-freedom measurement with high accuracy according to the displacement-time curve.

Described above are merely illustrative of the present disclosure, and not intended to limit the present disclosure. It should be noted that any improvements, variations and modifications made by those skilled in the art without departing from the scope of the disclosure shall fall within the scope of the present disclosure defined by the appended claims.

What is claimed is:

1. A six-degree-of-freedom measurement method by machine vision based on physical decoupling, comprising:
   (S1) placing a point projector on a measured object to enable the point projector to move with the measured object; placing a rear-projection screen in front of the measured object to enable a laser beam emitted by the point projector to be always projected on the rear-projection screen; placing a camera in front of the rear-projection screen, such that a shooting coverage of the camera covers the rear-projection screen; and performing, by the camera, an image collection for the rear-projection screen to obtain an image sequence;
   (S2) performing an image processing on the image sequence; and utilizing an ellipse center positioning method to obtain plane coordinates of three laser points;
   (S3) building a mathematical decoupling model according to a nature of sphere and a spatial position relationship of three laser beams; and
   (S4) inputting the plane coordinates of the three laser points into the mathematical decoupling model to obtain a six-degree-of-freedom information of the measured object in combination with a pose transformation matrix.

2. The six-degree-of-freedom measurement method of claim 1, wherein the step (S2) comprises:
   building a rear-projection screen coordinate system {S};
   wherein a plane formed by ${}^sx$-${}^sy$ coincides with the rear-projection screen, and a direction of ${}^sz$ is determined by right-hand rule;
   when the three laser beams are not perpendicular to the rear-projection screen, the three laser points projected on the rear-projection screen are elliptic, so that the ellipse center positioning method is used to obtain plane coordinates of center points of the three elliptic laser points on the rear-projection screen;
   performing an edge detection according to a pixel value of an image of the image sequence so as to obtain coordinates of edge points of the three elliptic laser points; and obtaining coordinates of center points of the three elliptic laser points through a least squares fitting method, which are $F_1(x_1,y_1)$, $F_2(x_2, y_2)$ and $F_3(x_3, y_3)$, respectively;

the least squares fitting method is expressed as follows:

$$f(A, B, C, D, E, F) = Ax^2 + Bxy + Cy^2 + Dx + Ey + F \quad (1)$$

$$\frac{\partial f}{\partial A} = \frac{\partial f}{\partial B} = \frac{\partial f}{\partial C} = \frac{\partial f}{\partial D} = \frac{\partial f}{\partial E} = \frac{\partial f}{\partial F} = 0 \quad (2)$$

wherein the formula (1) is an ellipse formula, and it needs to satisfy the formula (2) for minimizing a value of the function $f$, a linear equation set is obtained according to the formula (2); and an ellipse coefficient is obtained by solving the linear equation set to obtain a coordinate of a center point of an ellipse;

obtaining coordinates of $F_1$, $F_2$ and $F_3$ in the rear-projection screen coordinate system through a camera imaging model shown as formula (3):

$$z_c \begin{bmatrix} u \\ v \\ 1 \end{bmatrix} = M_{in} M_{out} \begin{bmatrix} x \\ y \\ z \\ 1 \end{bmatrix} \quad (3)$$

wherein $z_c$ is a coordinate of a spatial point A(x,y,z) along an optical axis in a camera coordinate system; (u,v) is a coordinate of a projection point A' of the spatial point A in a pixel coordinate system; $M_{in}$ is an intrinsic parameter matrix of the camera obtained by calibrating the camera; $M_{out}$ is an external parameter matrix of the camera obtained by a relative position relationship between the camera coordinate system and the rear-projection screen coordinate system; and obtaining coordinates of $F_1$, $F_2$ and $F_3$ in the rear-projection screen coordinate system through the formula (1) as $({}^sx_{F1}, {}^sy_{F1}, {}^sz_{F1})$, $({}^sx_{F2}, {}^sy_{F2}, {}^sz_{F2})$ and $({}^sx_{F3}, {}^sy_{F3}, {}^sz_{F3})$, respectively.

3. The six-degree-of-freedom measurement method of claim 1, wherein the step (S3) comprises:
   obtaining formula (4) when a point P(x,y,z) is on a sphere O:

$$(x-x_0)^2 + (y-y_0)^2 + (z-z_0)^2 = r_0^2 \quad (4)$$

wherein $(x_0, y_0, z_0)$ is a coordinate of a center point of the sphere O; and $r_0$ is a radius of the sphere O;

according to the formula (4), when there are three non-coincident points on a surface of the sphere O, and a connecting line between two of the three points passes through the center point of the sphere O, a triangle formed by the three points is a right triangle;

obtaining three spheres $O_1$, $O_2$ and $O_3$ according to a spatial position relationship that the three laser beams are perpendicular to each other, wherein the spheres $O_1$, $O_2$ and $O_3$ have a diameter of $\|F_1F_2\|$, $\|F_2F_3\|$ and $\|F_1F_3\|$, respectively; $O_1$, $O_2$ and $O_3$ are center points of the spheres $O_1$, $O_2$ and $O_3$, respectively; $O_1$, $O_2$ and $O_3$ are midpoints of line segments $F_1F_2$, $F_2F_3$ and $F_1F_3$, respectively; expressed as follows:

$$\begin{cases} (x - {}^sx_1)^2 + (y - {}^sy_1)^2 + (z - {}^sz_1)^2 = \frac{\|F_1F_2\|^2}{4} \\ (x - {}^sx_2)^2 + (y - {}^sy_2)^2 + (z - {}^sz_2)^2 = \frac{\|F_2F_3\|^2}{4} \\ (x - {}^sx_3)^2 + (y - {}^sy_3)^2 + (z - {}^sz_3)^2 = \frac{\|F_1F_3\|^2}{4} \end{cases} \quad (5)$$

wherein $({}^sx_1, {}^sy_1, {}^sz_1)$, $({}^sx_2, {}^sy_2, {}^sz_2)$ and $({}^sx_3, {}^sy_3, {}^sz_3)$ are spatial coordinates of $O_1$, $O_2$ and $O_3$, respectively; and $({}^sx_1, {}^sy_1, {}^sz_1)$, $({}^sx_2, {}^sy_2, {}^sz_2)$ and $({}^sx_3, {}^sy_3, {}^sz_3)$ are obtained according to values of $F_1$, $F_2$ and $F_3$; and the spheres $O_1$, $O_2$ and $O_3$ intersect at two points; one of the two points is an intersection point $L({}^sx_1, {}^sy_1, {}^sz_1)$ of the three laser beams solved according to the formula (5); a spatial motion of the point projector by is expressed by a change of a spatial coordinate $L({}^sx_1, {}^sy_1, {}^sz_1)$ of the point projector; since depth information of $F_1$, $F_2$ and $F_3$ keeps unchanged, a plane spatial motion of the three laser points is represented by changes of plane coordinates of $F_1$, $F_2$ and $F_3$; and building the mathematical decoupling model of the measured object from spatial motion measurement to plane motion measurement by the formula (5).

4. The six-degree-of-freedom measurement method of claim 1, wherein the step (S4) comprises:

building a point projector coordinate system $\{P\}$, wherein an origin point of the point projector coordinate system is an intersection point L of the three laser beams, ${}^Lx$, ${}^Ly$ and ${}^Lz$ coincide with directions of the three laser beams, respectively;

obtaining coordinates of the origin point of the point projector coordinate system $\{P\}$ and unit vectors of ${}^Lx$, ${}^Ly$ and ${}^Lz$ in the rear-projection screen coordinate system $\{S\}$ based on spatial coordinates of L, $F_1$, $F_2$ and $F_3$, expressed as the following homogeneous matrix:

$$ {}^sF = \begin{bmatrix} {}^sx_L & {}^sx_1 & {}^sy_1 & {}^sz_1 \\ {}^sy_L & {}^sx_2 & {}^sy_2 & {}^sz_2 \\ {}^sz_L & {}^sx_3 & {}^sy_3 & {}^sz_3 \\ 1 & 1 & 1 & 1 \end{bmatrix} \quad (6) $$

obtaining a rotation matrix ${}^LR_S$ and a translation matrix ${}^LT_S$ of the point projector coordinate system $\{P\}$ and the rear-projection screen coordinate system $\{S\}$ by combining a coordinate system transformation formula shown in formula (7) with ${}^sF$:

$$ {}^LF = \begin{bmatrix} 0 & 1 & 0 & 0 \\ 0 & 0 & 1 & 0 \\ 0 & 0 & 0 & 1 \\ 1 & 1 & 1 & 1 \end{bmatrix} = \begin{bmatrix} {}^LR_S & {}^LT_S \\ 0 & 1 \end{bmatrix} {}^sF; \quad (7) $$

and obtaining six-degree-of-freedom information $(x,y,x,\alpha,\beta,\gamma)$ of the point projector according to ${}^LR_S$ and ${}^LT_S$; and according to the step (S1); the six-degree-of-freedom information of the point projector is consistent with six-degree-of-freedom information of the measured object, thus obtaining the six-degree-of-freedom information of the measured object.

* * * * *